United States Patent
Hsieh

(10) Patent No.: US 7,254,664 B2
(45) Date of Patent: Aug. 7, 2007

(54) EXPRESS CARD INTERFACE ADAPTER

(75) Inventor: Hsiang-An Hsieh, Taipei (TW)

(73) Assignee: Carry Computer Eng. Co., Ltd., Taipei County (TW)

( * ) Notice: Subject to any disclaimer, the term of this patent is extended or adjusted under 35 U.S.C. 154(b) by 105 days.

(21) Appl. No.: 10/906,707

(22) Filed: Mar. 3, 2005

(65) Prior Publication Data
US 2005/0198423 A1 Sep. 8, 2005

(30) Foreign Application Priority Data
Mar. 4, 2004 (TW) .............................. 93203237 U

(51) Int. Cl.
*G06F 13/00* (2006.01)
(52) U.S. Cl. .................... 710/315; 710/301; 326/80
(58) Field of Classification Search ...................... None
See application file for complete search history.

(56) References Cited

U.S. PATENT DOCUMENTS

| | | | |
|---|---|---|---|
| 5,808,481 A | 9/1998 | Thompson | 326/83 |
| 6,131,134 A * | 10/2000 | Huang et al. | 710/302 |
| 6,141,719 A | 10/2000 | Rafferty et al. | 710/316 |
| 6,233,640 B1 * | 5/2001 | Luke et al. | 710/315 |
| 6,257,930 B1 | 7/2001 | Yu | 439/607 |
| 2003/0211784 A1 * | 11/2003 | Wu et al. | 439/638 |
| 2004/0044807 A1 * | 3/2004 | Wang et al. | 710/5 |
| 2004/0059860 A1 * | 3/2004 | Liu et al. | 710/313 |
| 2005/0138288 A1 * | 6/2005 | Chou et al. | 711/115 |
| 2005/0258243 A1 * | 11/2005 | Hsieh | 235/441 |
| 2005/0278469 A1 * | 12/2005 | Yi | 710/301 |

OTHER PUBLICATIONS

"The ExpressCard Standard—The Next Generation PC Card Technology" overview article; PCMCIA; Oct. 2003.*

* cited by examiner

*Primary Examiner*—Glenn A. Auve
(74) *Attorney, Agent, or Firm*—Jianq Chyun IP Office

(57) ABSTRACT

An Express Card interface adapter for desktop computers, laptop computers or portable electronic devices such as personal digital assistant (PDA) that allows an Express Card interface device to use an universal serial bus (USB) interface system. The Express Card interface adapter includes an Express Card interface connector unit, a voltage adjusting circuit and an USB interface connector unit. The voltage adjusting circuit reduces the power source voltage provided by the USB interface system to a voltage suitable for operating the Express Card interface device.

6 Claims, 1 Drawing Sheet

EXPRESS CARD INTERFACE ADAPTER

CROSS-REFERENCE TO RELATED APPLICATION

This application claims the priority benefit of Taiwan application serial no. 93203237, filed on Mar. 4, 2004.

BACKGROUND OF THE INVENTION

1. Field of the Invention

The present invention relates to an Express Card interface adapter. More particularly, the present invention relates to an Express Card interface adapter that allows connections with Express Card peripheral devices and a universal serial bus (USB) interface system.

2. Description of the Related Art

Aside from functional improvements in the North Bridge CPU and DRAM, rapid progress in information technologies also leads to the replacement of the 26-pin PCI socket with USB and PCI-Express interface socket. On one hand, there is a reduction in the pin number leading to a drop in the manufacturing cost of pins and a volume reduction in the externally plugged card. On the other hand, there is an increase in the transmission frequency and operating efficiency of electronic devices. Hence, how to set up external devices or adapter interfaces having USB and PCI-Express interface so that an efficient system operation is provided is much to be desired in the present day electronic industry.

Articles that described an external system or adapter system having a USB and PCI-Express interface include, for example, U.S. Pat. No. 6,141,719 submitted by Network Technologies, Inc. (Aurora, Ohio) with the title "USB selector switch", U.S. Pat. No. 6,257,930 submitted by Advanced Connecteck Inc. (Hsintien, TW) with the title "USB electrical connector", and U.S. Pat. No. 5,808,481 submitted by Intel Corporation (Santa Clara, Calif.) with the title "Output swing clamp for USB differential buffer". All of these represent some form of improvements of the USB device from the old specifications.

To enhance the frequency bandwidth of interface and facilitate the operation and lower the production cost of the system, the PCMCIA Association has introduced a new Express Card standard in the year 2003. The new Express card standard deploys USB 2.0 and PCI-Express as an interface for linking with the system. Since a single card can have two interfaces and can support high-speed data transmission and hot plugging/unplugging operation, the new interface specification will have considerable development potential in the future.

Although the new Express Card standard allows the built-in USB or PCI-Express interface to facilitate operation and lower overall system cost, its application is still quite limited because the standard is out for a limited time only. Consequently, external devices or related peripheral devices having an Express Card interface can hardly be linked to systems of the previous generation having built-in USB or PCI-Express interface and can only be used in electronic equipment having similarly built-in Express Card interface socket. In other words, external devices or related peripheral products having the Express Card interface cannot be directly plugged into the most common USB or PCI-Express interface currently in use. This significantly reduces the applicability of the new standard interface.

Therefore, a system and its peripheral products having the new Express Card interface and yet can be directly used in all existing USB or PCI-Express interface is very much sought after by people in the electronic industry.

SUMMARY OF THE INVENTION

Accordingly, at least one objective of the present invention is to provide an Express Card interface adapter that can be applied to electronic equipment having an USB 2.0 and PCI-Express interface to expand product applicability and facilitate operation.

At least a second objective of the present invention is to provide an Express Card interface adapter that can adjust the power source provided by a universal serial bus (USB) system to provide a power source suitable for operating the Express Card interface. Hence, the Express Card interface can be used everywhere in electronic equipment having the USB interface.

To achieve these and other advantages and in accordance with the purpose of the invention, as embodied and broadly described herein, the invention provides an Express Card interface adapter. The Express Card interface adapter is suitable for desktop computers, notebook computers or personal digital assistant (PDA) and allows Express Card interface devices to connect with a USB interface system. The Express Card interface adapter comprises an Express Card interface connector unit, a voltage adjusting circuit and a USB interface connector unit.

The USB interface connector unit connects with the an external USB interface system. The USB interface connector unit further comprises a plurality of pins that meet the USB interface standard. The pins include two signaling pins (U_DM and U_DP) and a power pin (VCC) for transmitting the power source provided by the USB interface system.

The voltage adjusting connector unit reduces a power source voltage provided by the USB interface system to a voltage suitable for operating the Express Card interface device.

The Express Card interface connector unit connects with an external Express Card interface device. The Express Card interface connector unit includes a plurality of pins that meet the Express Card interface standard. The pins comprise two signaling pins (USB_D+ and USB_D−) and a power pin (VCARD) for transmitting an adjusted operating voltage from the voltage adjusting circuit to the Express Card interface device.

The signaling pins (USB_D+ and USB_D−) of the Express Card interface connector unit are connected to the signaling pins (U_DM and U_DP) of the USB interface connector unit through signaling wires. When the Express card interface adapter of the present invention is plugged into USB interface system, the USB interface system will provide power to the voltage adjusting circuit via the USB interface connector unit. Then, the voltage adjusting circuit will reduce the voltage of the power source and transmit the adjusted voltage to the power source pin (VCARD) of the Express Card interface connector unit. Thus, the voltage from the voltage adjusting circuit is able to provide an operating voltage suitable for driving the Express Card interface device. The adjusted operating voltage is 3.3V while the power source of the USB interface system provides a voltage of 5.0V. Furthermore, the voltage adjusting circuit is able to output an operating voltage of precisely 3.3V. Aside from providing a main downward voltage adjustment, the voltage adjusting circuit may further comprise other devices for providing a precise output of 3.3V such as a voltage micro-adjuster.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
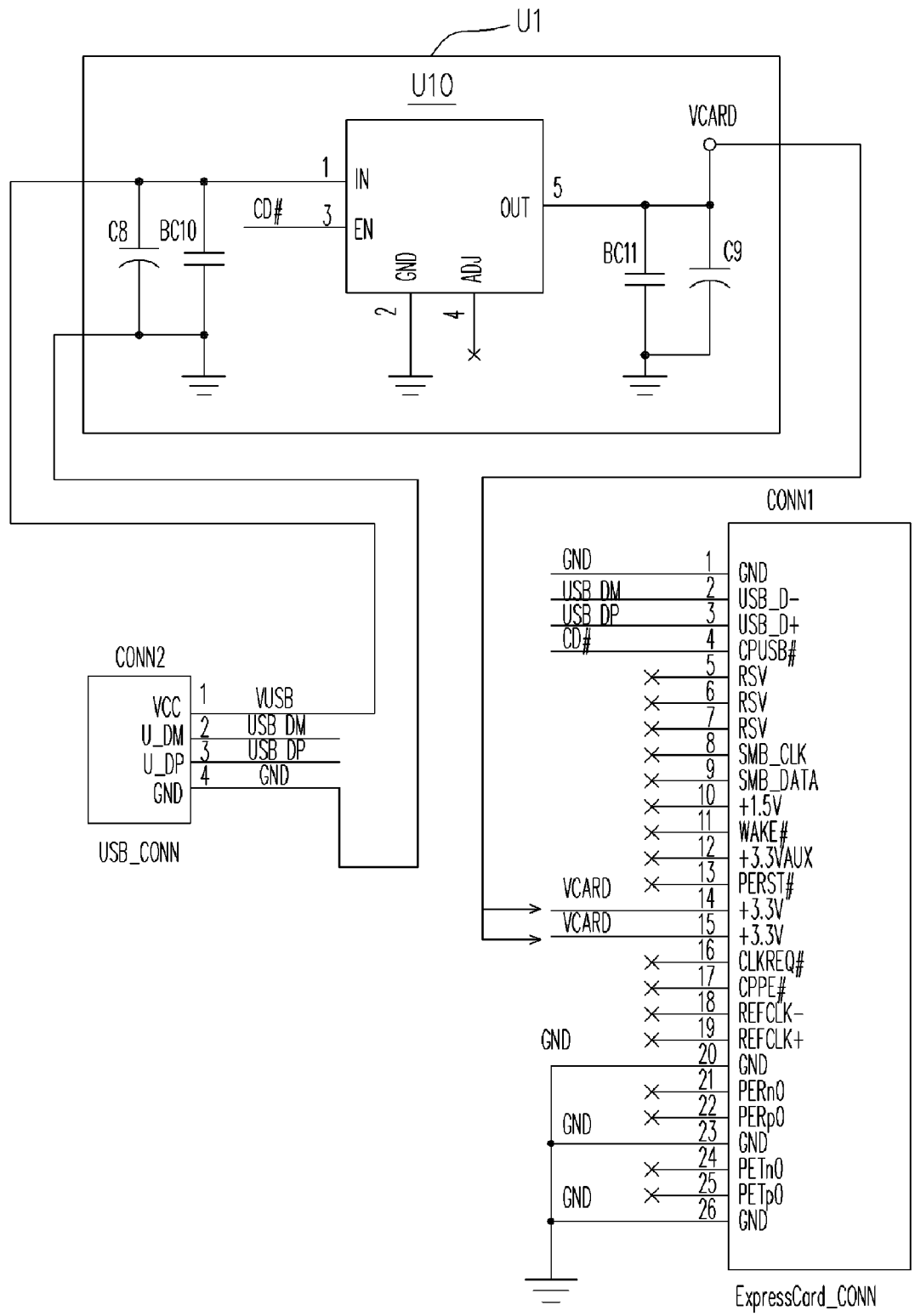
FIG. 1 is a diagram showing the applications of various electrical pins in the Express Card interface adapter according to the present invention.

Reference will now be made in detail to the present preferred embodiments of the invention, examples of which are illustrated in the accompanying drawings. Wherever possible, the same reference numbers are used in the drawings and the description to refer to the same or like parts.

In the following description, a USB 2.0 interface is used as an example in the embodiment of the present invention. Anyone familiar with the technologies can easily understand various other functions and advantages that follow from the content disclosed in the present invention. The present invention can also be implemented and applied through other embodiments (for example, the PCI-Express interface). In addition, the details can be modified or changed according to one's point of view and applications without departing too much from the scope, spirit and other purposes of the present invention.

FIG. 1 is a diagram showing the applications of various electrical pins in the Express Card interface adapter according to the present invention. Here, only those units related to the functioning of the interface adapter are included. Other units unrelated to the specification of the present invention are not displayed.

As shown in FIG. 1, the Express Card interface adapter of the present invention mainly comprises a voltage adjusting circuit (U1) for adjusting a power source voltage, an Express Card interface connector unit (CONN1) for connecting with an interface and a universal serial bus (USB) interface connector unit (CONN2).

The USB interface connector unit (CONN2) includes four connecting pads that meet the electrical specification of a USB interface: they are VCC, USB_DM, USB_DP and GND. When the Express Card interface adapter is plugged into the USB interface system, the four signaling lines of the USB interface connector unit (CONN2) are connected to corresponding signaling pins of the USB interface system. The VCC pin of the USB interface provides a 5.0V power source.

The Express Card interface connector unit (CONN1) comprises 26 connecting pads that meet the Express Card interface standard including power source pins (VCARD), USB signaling pins (USB_D+, USB_D−), a CPU enabling pin (CPUSB#) and ground pins (GND). As for the definition of each connecting pin, refer to the specifications of the Express Card. The power source pin of the Express Card interface needs to receive an operating voltage of 3.3V to drive the Express Card interface. If the power source voltage is greater than 3.3V, then the Express Card interface device is vulnerable to damage. On the contrary, if the power source voltage is smaller than 3.3V, then the Express Card interface device can hardly work.

Because the 3.3V provided by the Express Card interface is different from the 5.0V provided by the USB interface system, one must deal with the operating voltage problem before the Express Card interface device can be used in the widely installed conventional USB interface system. To resolve this problem, the present invention provides an additional voltage adjusting circuit (U1) between the Express Card interface connector unit (CONN1) and the USB interface connector unit (CONN2). The voltage adjusting circuit (U1) adjusts the power source voltage from the USB interface system and converts the power source voltage into one that manages to drive the Express Card interface without any damages.

When the Express Card interface adapter of the present invention is connected to the USB interface system, the USB interface transmits 5.0V to the USB interface connector unit (CONN2). The 5.0V is transmitted to the voltage adjusting circuit (U1) through the VBUS line and reduced to 3.3V before outputting 3.3V from the power source pin of the Express Card interface connector unit (CONN1). The voltage adjusting circuit (U1) mainly serves to downward-adjust the voltage to 3.3V precisely. Hence, the voltage adjusting circuit (U1) mainly includes a main voltage adjusting device (for example, a wave filter comprising the passive elements C8 and BC10) and other devices for fine-tuning the 3.3V output such as a voltage micro-adjusting device U10. Moreover, the Express Card interface has a USB 2.0 interface as well as a PCI-Express interface. Hence, the voltage adjusting circuit (U1) outputs an enable signal to CPUSB# via the CD# to inform the Express Card interface device that the current system is a USB interface rather than a PCI Express interface so that a suitable interface transmission can be performed.

The USB signal from the U_DM and U_DP pin of the USB interface connector unit (CONN2) are directly connected to the USB_D− and USB_D+pin of the Express Card interface connector unit (CONN1) via the USB_DM and USB_DP line serving as a transmission pathway.

Anyone familiar with the technology may notice that the aforementioned Express Card interface connector unit (CONN1) and the USB interface connector unit (CONN2) are actually the two external ports for connecting with the Express Card interface device and the USB interface system. Hence, the principle physical configuration of the present invention includes an Express Card plugging slot for accommodating an Express Card interface device operating on an Express Card interface standard and a USB plugging slot for accommodating a USB interface system operating on a USB interface standard.

Although the voltage adjusting circuit (U1) is an additional device, its implementation is not a problem. The voltage from the USB interface connector unit (CONN2) is passed to the voltage adjusting circuit (U1) via the VUSB power source line for voltage reduction and then the reduced voltage is sent to the power source pin (VCARD) of the Express Card interface connector unit (CONN1). Thus, for the widely used USB interface system, this innovation has unlimited expansion capability in various applications. Furthermore, any loading variation after plugging the Express Card into the adapter of the present invention can be absorbed by a voltage regulator comprising passive devices C9 and BC1 inside the voltage adjusting circuit (U1). Through the attenuation of any loading variation by the voltage regulator, the adapter of the present invention can have higher operation stability.

It should be noted that the USB interface is used in the example of the aforementioned embodiment for showing the operating principles and effect of the present invention. Hence, this should by no means limit the scope of the present invention. In fact, there are many applications for the Express Card interface adapter in the present invention. In general, the Express Card interface adapter can be applied to interface with various South Bridge expansion devices. Even if the USB specification in the Express Card changes to a version different from 2.0 in the future, as long as the USB interface system provides 5.0V and the Express Card interface device requires 3.3V, the present invention can still be used to link up an Express Card interface device with a USB interface system. Furthermore, the details can be modified or changed according to one's point of view and applications without departing too much from the scope, spirit and other purposes of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An Express Card interface adapter for connecting an Express Card interface device to a USB interface system, the Express Card adapter comprising:
    a USB interface connector unit for connecting with the USB interface system, wherein the USB interface connector unit has a plurality of pins that meet the USB interface standard, and the pins include a plurality of first signaling pins and a first power source pin for transmitting power to the USB interface system;
    an Express Card interface connector unit for connecting with the Express Card interface device, wherein the Express Card interface device has a plurality of pins that meet the Express Card interface standard, and the pins include a plurality of second signaling pins and at least a second power source pin for transmitting power to the Express Card interface device such that the second signaling pins are connected to the corresponding first signaling pins of the USB interface connector unit; and
    a voltage adjusting circuit electrically connected to the first and the second power source pin for adjusting the power from the USB interface system via the first power source pin and transmitting the adjusted operating voltage to the Express Card interface device through the second power source pin, wherein the voltage adjusting circuit further comprises a voltage-reducing device.

2. The Express Card interface adapter of claim 1, wherein the USB interface system provides a 5.0V power source.

3. The Express Card interface adapter of claim 1, wherein the operating voltage needed to drive the Express Card interface device is 3.3V.

4. The Express Curd interface adapter of claim 1, wherein the voltage-reducing device comprises a wave filter constructed using a passive electrical device.

5. The Express Card interface adapter of claim 1, wherein the voltage adjusting circuit further comprises a micro-voltage adjuster for outputting a precise operating voltage.

6. The Express Card interface adapter of claim 1, wherein the adapter further comprises a voltage regulator constructed using a passive electrical device.

* * * * *